United States Patent
Huang et al.

(10) Patent No.: US 11,656,597 B2
(45) Date of Patent: May 23, 2023

(54) METHOD AND SYSTEM FOR RECOGNIZING DEBURRING TRAJECTORY

(71) Applicant: INDUSTRIAL TECHNOLOGY RESEARCH INSTITUTE, Hsinchu (TW)

(72) Inventors: Cheng-Kai Huang, Taichung (TW); Yi-Ying Lin, Taichung (TW); Bing-Cheng Hsu, Changhua County (TW); Jan-Hao Chen, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 204 days.

(21) Appl. No.: 17/193,005

(22) Filed: Mar. 5, 2021

(65) Prior Publication Data
US 2022/0176467 A1    Jun. 9, 2022

(30) Foreign Application Priority Data
Dec. 7, 2020 (TW) .................................. 109143082

(51) Int. Cl.
*B25J 9/16*     (2006.01)
*G05B 19/19*    (2006.01)
(Continued)

(52) U.S. Cl.
CPC ................ *G05B 19/19* (2013.01); *B23C 3/12* (2013.01); *B25J 9/1664* (2013.01); *B25J 9/1697* (2013.01);
(Continued)

(58) Field of Classification Search
CPC ...... B25J 11/006; B25J 9/1684; B25J 9/1697; B25J 9/1664; G05B 19/19; G05B 19/4099; G05B 2219/45151; B23C 3/12
See application file for complete search history.

(56) References Cited

U.S. PATENT DOCUMENTS 4,777,769 A * 10/1988 McLaughlin ........... B24B 49/12
                                                    451/6
4,894,597 A *  1/1990 Ohtomi ............... B25J 11/0065
                                                  318/568.22
(Continued)

FOREIGN PATENT DOCUMENTS

AT         476692 T    8/2010
AT         483185 T    10/2010
(Continued)

OTHER PUBLICATIONS

Taiwan Patent Office, "Office Action", dated Aug. 24, 2021, Taiwan.
(Continued)

*Primary Examiner* — Stephen Holwerda
(74) *Attorney, Agent, or Firm* — Locke Lord LLP; Tim Tingkang Xia, Esq.

(57) ABSTRACT

A method for recognizing a deburring trajectory, relevant to be performed by a controller or a computer, includes the steps of: according to a process flow of a workpiece, analyzing a CAD file of the workpiece, determining a burr processing area and obtaining a mathematical model of boundary contour curve; applying a linear contour sensor to scan the workpiece to obtain contour section information of the workpiece; performing curve fitting upon the contour section information of the workpiece and the mathematical model of boundary contour curve so as to obtain a boundary curve function; and, utilizing the boundary curve function to determine deburring position information of the workpiece
(Continued)

and to further generate a processing path. In addition, a system for recognizing a deburring trajectory is also provided.

3 Claims, 8 Drawing Sheets

(51) Int. Cl.
  *B23C 3/12*   (2006.01)
  *B25J 11/00*   (2006.01)
  *G05B 19/4099*   (2006.01)
(52) U.S. Cl.
  CPC ......... *B25J 11/006* (2013.01); *G05B 19/4099* (2013.01); *G05B 2219/45151* (2013.01)

(56) References Cited

U.S. PATENT DOCUMENTS

| | | | |
|---|---|---|---|
| 4,907,169 A | | 3/1990 | Lovoi |
| 5,940,302 A | * | 8/1999 | Pryor ..................... G01S 17/48 356/628 |
| 6,155,757 A | | 12/2000 | Neumann |
| 8,706,300 B2 | | 4/2014 | Krause et al. |
| 9,724,801 B2 | | 8/2017 | Gu |
| 9,919,428 B2 | | 3/2018 | Aregall et al. |
| 10,478,935 B2 | | 11/2019 | Gu et al. |
| 2008/0027580 A1 | | 1/2008 | Zhang et al. |
| 2009/0125146 A1 | * | 5/2009 | Zhang .................. G05B 19/423 700/253 |
| 2009/0259412 A1 | | 10/2009 | Brogardh |
| 2011/0282492 A1 | * | 11/2011 | Krause .................. B25J 9/1664 901/47 |
| 2013/0203320 A1 | * | 8/2013 | Ghalambor ............. B24C 1/083 451/2 |
| 2015/0039122 A1 | * | 2/2015 | Barakchi Fard ....... G05B 19/19 700/186 |
| 2017/0129066 A1 | * | 5/2017 | Okuda .................... B24B 49/12 |
| 2018/0161952 A1 | * | 6/2018 | Gu ...................... B24B 27/0038 |
| 2019/0299406 A1 | * | 10/2019 | Kurokawa ............. B25J 13/006 |

FOREIGN PATENT DOCUMENTS

| | | |
|---|---|---|
| BR | 112015028755 A2 | 7/2017 |
| CA | 2912589 A1 | 11/2014 |
| CN | 101390027 A | 3/2009 |
| CN | 102378943 A | 3/2012 |
| CN | 105149794 A | 12/2015 |
| CN | 106041948 A | 10/2016 |
| CN | 104249195 B | 1/2017 |
| CN | 106994684 A | 8/2017 |
| CN | 105377513 B | 5/2018 |
| CN | 106041948 B | 8/2018 |
| CN | 108672988 B | 10/2019 |
| CN | 110536773 A | 12/2019 |
| CN | 110990974 A | 4/2020 |
| CN | 108176897 B | 6/2020 |
| CN | 111983973 A | 11/2020 |
| DE | 602008002823 | 8/2010 |
| DE | 602007008206 | 9/2010 |
| DE | 102014108956 B4 | 12/2016 |
| DE | 102017128757 A1 | 6/2018 |
| DE | 112010000794 B4 | 4/2019 |
| DE | 112017007302 T5 | 1/2020 |
| EP | 1987406 B1 | 8/2010 |
| EP | 2122422 B1 | 9/2010 |
| EP | 2998080 B1 | 3/2018 |
| ES | 2522921 B2 | 7/2015 |
| ES | 2671468 T3 | 6/2018 |
| JP | 2015212012 A | 11/2015 |
| JP | 5845212 B2 | 1/2016 |
| JP | 5981143 B2 | 8/2016 |
| JP | 6362795 B1 | 7/2018 |
| JP | 6457468 B2 | 1/2019 |
| KR | 20160010868 A | 1/2016 |
| KR | 102059336 B1 | 12/2019 |
| PT | 2998080 T | 6/2018 |
| TW | 1667095 B | 8/2019 |
| WO | 2007096322 A2 | 8/2007 |
| WO | 2008113807 A2 | 9/2008 |
| WO | 2010091086 A1 | 8/2010 |
| WO | 2014184414 A1 | 11/2014 |
| WO | 2018198274 A1 | 11/2018 |

OTHER PUBLICATIONS

Leo Princely F et al., Vision Assisted Robotic Deburring of Edge Burrs in Cast Parts, Procedia Engineering vol. 97, 2014, pp. 1906-1914.

Hee-Chan Song et al., Tool Path Generation based on Matching between Teaching Points and CAD Model for Robotic Deburring, The 2012 IEEE/ASME International Conference on Advanced Intelligent Mechatronics.

Wanjin Guo et al., A Robotic Deburring Methodology for Tool Path Planning and Process Parameter Control of a Five-Degree-of-Freedom Robot Manipulator, 2019, Applied Sciences 9(10):2033.

Hubert Kosler et al., Adaptive Robotic Deburring of Die-Cast Parts with Position and Orientation Measurements Using a 3D Laser-Triangulation Sensor, Strojniški vestnik—Journal of Mechanical Engineering 62(2016)4, 207-212.

Alexander Kuss et al., Detection of workpiece shape deviations for tool path adaptation in robotic deburring systems, Procedia CIRP, vol. 57, 2016, pp. 545-550.

Julian Ricardo Diaz Posada et al., Automatic Programming and Control for Robotic Deburring, Proceedings of ISR 2016: 47st International Symposium on Robotics.

* cited by examiner

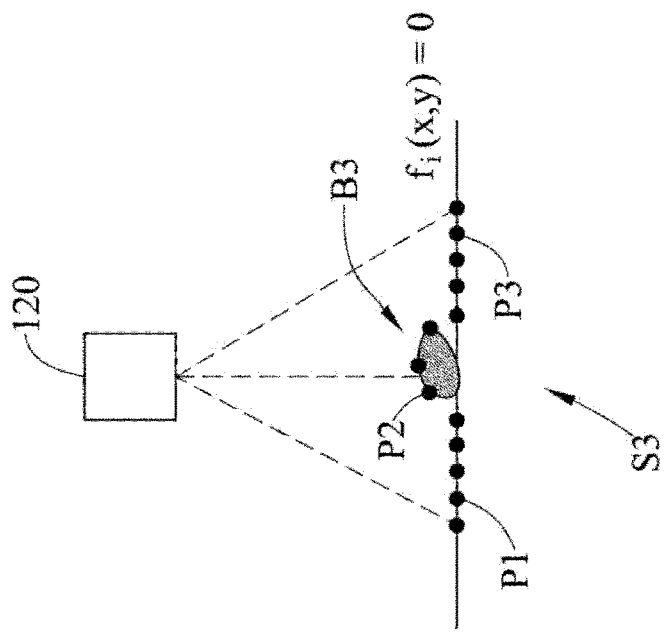
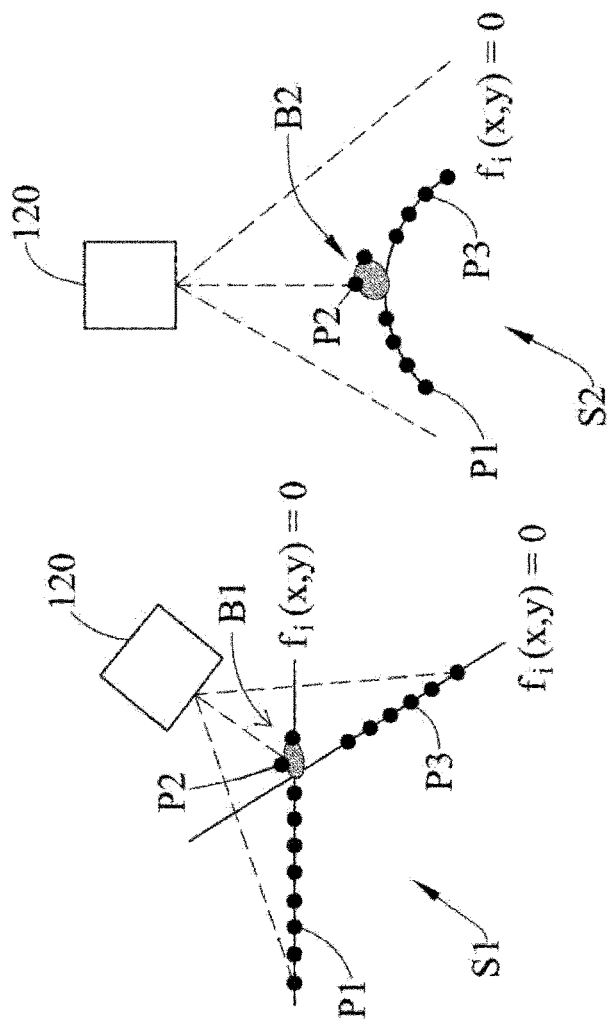
FIG. 7A  FIG. 7B  FIG. 7C

METHOD AND SYSTEM FOR RECOGNIZING DEBURRING TRAJECTORY

CROSS REFERENCE TO RELATED APPLICATION

This application claims the benefits of Taiwan application Serial No. 109143082, filed on Dec. 7, 2020, the disclosures of which are incorporated by references herein in its entirety.

TECHNICAL FIELD

The present disclosure relates in general to a method and a system for recognizing a deburring trajectory.

BACKGROUND

In a metal machining process such as casting, cutting, forging or any other machining means, a deburring process needs to be done always for removing burrs inevitably generated during the machining process. In the art, though a robotic arm may be utilized to perform the deburring automatically, yet, in the robotic work for deburring, plenty of adverse factors exist, such as unignorable dimension error in casting, irregular distribution of burrs and ill dynamic trajectory precision of robotic arm. Thus, the deburring process after machining is mostly relied on human work. As such, experience and professional skills are the most important keys for a satisfied deburring process.

Currently, prior to an automatic deburring process, characteristics recognition and offline coding upon a 3D ideal model of workpiece shall be performed to generate a machining trajectory. However, since the robotic arm is far from an acceptable trajectory precision, also a dynamic trajectory adjustment during the robotic work is difficult, and each step of the machining exists individual machining error, all these reasons would make the object workpiece to be deburred have different dimensions to the CAD (Computer aided design) model for simulations. As a consequence, the cutter for machining will be hard to follow the scheduled trajectory, and thus the machining finish would be definitely unsatisfied. This is the reason why the current deburring process is mainly carried out by human labor. Obviously, improving the ill deburring performance of the automatic process using the robotic arm is now one of urgent issues to the skill in the art.

SUMMARY

An object of the present disclosure is to provide a method and a system for recognizing a deburring trajectory that can perform online burr detection and further organize a processing path for deburring. Thereupon, by introducing a means to track the burr trajectory, dynamic precision of the robotic arm and dimensional variation in the workpiece can be substantially compensated, such that the automatic deburring process can be realized.

In one embodiment of this disclosure, a method for recognizing a deburring trajectory, relevant to be controlled by a controller or a computer, includes the steps of: according to a process flow of a workpiece, analyzing a CAD file of the workpiece, determining a burr processing area and obtaining a mathematical model of boundary contour curve; applying a linear contour sensor to scan the workpiece to obtain contour section information of the workpiece; performing curve fitting upon the contour section information of the workpiece and the mathematical model of boundary contour curve so as to obtain a boundary curve function; and, utilizing the boundary curve function to determine deburring position information of the workpiece and to further generate a processing path.

In another embodiment of this disclosure, a system for recognizing a deburring trajectory, relevant to connect a linear contour sensor, includes a control module, connected with the linear contour sensor, used for scanning a workpiece, obtaining contour section information of the workpiece, based on a process flow of the workpiece to analyze a CAD file of the workpiece so as to determining a burr processing area and to obtain a mathematical model of boundary contour curve, performing curve fitting upon the contour section information of the workpiece and the mathematical model of boundary contour curve so as to obtain a boundary curve function, further applying the boundary curve function to determine deburring position information of the workpiece and to generate a processing path.

As stated, the method and system for recognizing a deburring trajectory provided by this disclosure implement a curve-fit algorithm to determine deburring position information of the workpiece so as to further generate a corresponding processing path for resolving the aforesaid instant shortcomings of the art, such as human teaching and 3D-point cloud analysis. Thereupon, disadvantages of time-consuming and hard-to-tracking for human teaching or 3D-point cloud analysis in the art can be well avoided. In addition, the processing path error and dimensional variation of workpiece can be compensated in time, and so the entire processing quality can be substantially enhanced.

Further, the linear contour sensor is used for capturing the section contour information, and the burr distribution as well as generation of the deburring trajectory can be determined by simply analyzing one of the section contour information. Thus, by providing this disclosure, tracking the deburring trajectory can be performed online, and, without complete scan data of the workpiece, the analytic work can be also executed to proceed online path track and trajectory error compensation.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 7A shows schematically a curve-fit result for the contour points of FIG. 4A;

FIG. 7B shows schematically a curve-fit result for the contour points of FIG. 4B;

FIG. 7C shows schematically a curve-fit result for the contour points of FIG. 4C.

DETAILED DESCRIPTION

Figure 1:
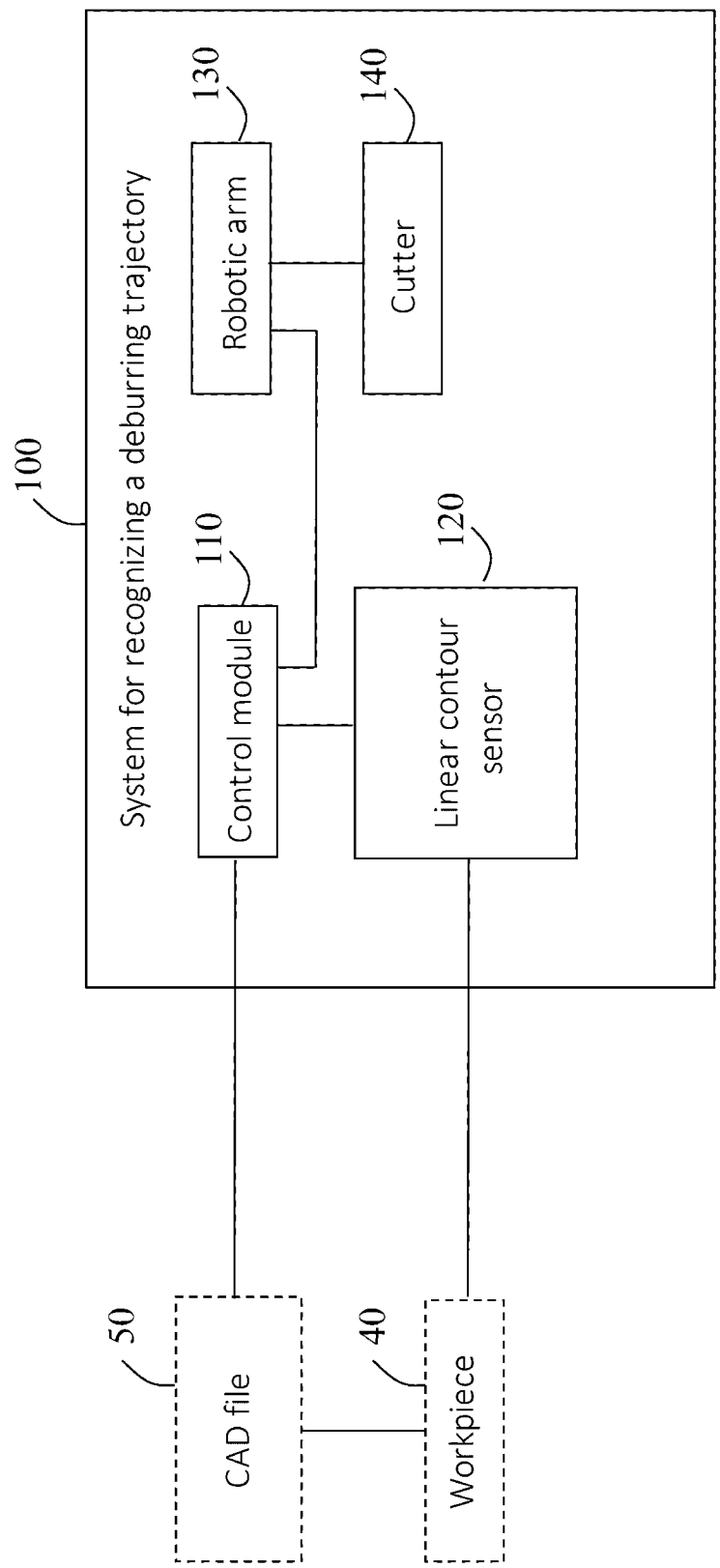
FIG. 1 is a schematic block view of the system for recognizing a deburring trajectory in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic block view of the system for recognizing a deburring trajectory in accordance with this disclosure. As shown, in this embodiment, the system for recognizing a deburring trajectory 100 can be a controller or a computer that connects a robotic arm and versatile sensors so as able to perform a deburring process upon a workpiece 40. The workpiece 40 can be a workpiece processed by casting, cutting, forging or any other process. The system for recognizing a deburring trajectory 100 includes mainly a control module 110, a linear contour sensor 120, a robotic arm 130 and a cutter 140. The control module 110 is connected with the linear contour sensor 120. The linear contour sensor 120 is used to scan a workpiece 40 so as to obtain contour section information of the workpiece 40. The linear contour sensor 120 can be a line scan camera or any type of scan sensors for laser linear scan. In this embodiment, the control module 110 evaluates a CAD (Computer aided design) file 50 of the workpiece 40 to obtain areas to be deburred, mathematical models of boundary contour curves and the aforesaid contour section information of the workpiece 40. A curve fitting algorithm is applied to investigate and also determine burr positions of the workpiece 40, such that a corresponding processing path or a corresponding machining trajectory can be generated. The control module 110 connects the robotic arm 130, and the robotic arm 130 is further furnished with the cutter 140. The cutter 140 can be varied according to a practical machining process for the workpiece 40. The control module 110 can evaluate the aforesaid processing path to move the robotic arm 130 so as to further displace the cutter 140 to machine the workpiece 40. Thereupon, the deburring process can be performed automatically.

Figure 2:
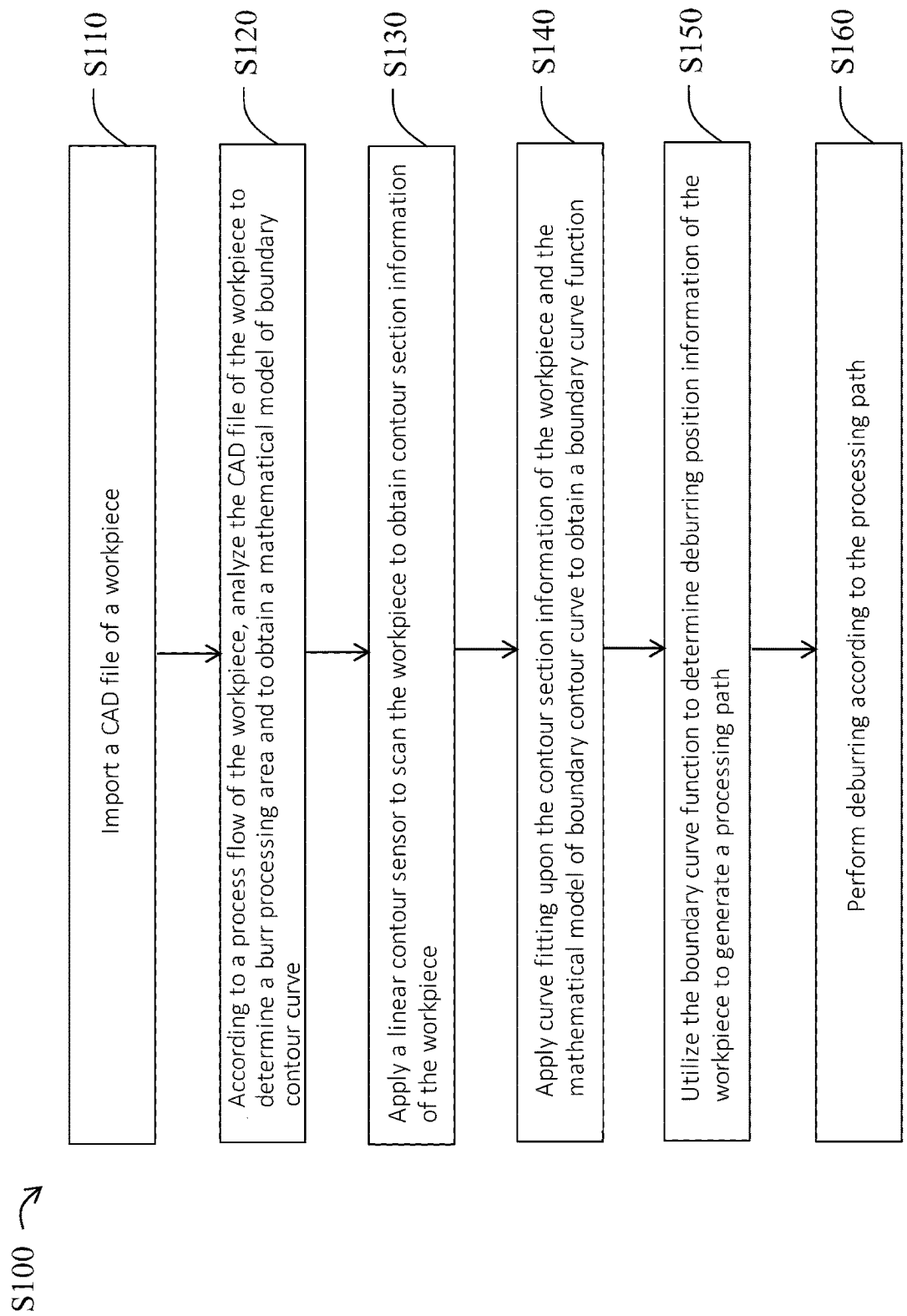
FIG. 2 is a flowchart of the method for recognizing a deburring trajectory in accordance with this disclosure.

FIG. 2 is a flowchart of the method for recognizing a deburring trajectory in accordance with this disclosure. As shown, in this embodiment, the method for recognizing a deburring trajectory S100 is executed by the system for recognizing deburring trajectory 100, in which the method for recognizing a deburring trajectory S100 includes Step S110 to Step S160 as follows. Firstly, in Step S110, the CAD file 50 (such as a 3D drawing file) of the workpiece 40 is imported. Then, in Step S120, according to the process flow of the workpiece 40, the CAD file 50 of the workpiece 40 is analyzed to further determine the burr processing area and obtain the mathematical model of the boundary contour curve. The aforesaid process flow includes a preceding machining pattern and its cutting directions. Since the process flow of the workpiece 40 is given, thus positions of the burr processing areas corresponding to the CAD file 50 of the workpiece 40 can be determined. Namely, the areas needed to be deburred at the workpiece 40 corresponding to the process flow can be obtained. For example, if the preceding process flow is a cutting process, then the burr processing area could be the cutting boundary. If the preceding process flow is a casting or an injection modelling, then the burr processing areas would include gates, risers, parting-line areas, processing edges and other areas.

The aforesaid Step S120 includes a step of deriving cross sections at the burr processing areas of the workpiece 40 in a cutting direction so as to obtain the section contour information of the working areas. For example, if the burr processing area is formed by the parting line, then a plurality of cross sections would be orderly formed in the cutting direction with respect to the parting line so as to obtain section contour information of the working area; namely, the contours of the cross sections (for example, circular section contours for the parting lines of a tubular workpiece). The cutting direction can be a machining boundary direction or a parting-line direction. If the deburring is related to the gates and/or risers (could be a unique area), then the reciprocal manner can be adopted to generate regional modified path searching along the curve surface of the workpiece 40. Then, according to the section contour curve characteristics of the burr processing area, the section contour information of the working area is divided into a plurality of segments to determine individually the mathematical models of boundary contour curves of the workpiece 40. The section contour curve characteristics can be directed to a circle or an ellipse. According to different section contour curve characteristics, different mathematical models of the boundary contour curves would be generated, such as a polynomial boundary curve function $f(x)=\Sigma_{i=0}^{n}(a_i x^i)$, in which n stands for the order of the polynomial function; a circular boundary curve function $f(x, y)=x^2+y^2+Cx+Dy+E$; an elliptic boundary curve function $$f(x, y) = \frac{\left(\frac{nx-my+q}{\sqrt{m^2+n^2}}\right)^2}{a^2} + \frac{\left(\frac{mx+ny+q}{\sqrt{m^2+n^2}}\right)^2}{b^2} - 1;$$

a parabolic boundary curve function $f(x, y)=4ax-y^2$; a square oval boundary curve function $f(x, y)=(x-a)^4+(y-b)^4-r^4$; or, a hyperbolic function $$f(x, y) = \frac{x^2}{a^2} - \frac{y^2}{b^2} - 1.$$

It shall be explained that the aforesaid determination of the mathematical models of boundary contour curves for the workpiece 40 can further include an error analysis upon the curve fit calculations for confirming whether or not error of the corresponding curve fit model satisfies a preset value (such as a determination coefficient >0.99), such that an optimal mathematical model of boundary contour curve can be obtained. For example, by having a polynomial boundary curve function as an example, the determination coefficient can be used for performing the error analysis and model evaluation. If a data set includes $y_1, \ldots, y_n$, totally n observed values, and the corresponding model predicted values are $f_1, \ldots, f_n$, respectively, then the residual difference is $e_i = y_i - f_i$, the average observed value is $$\bar{y} = \frac{1}{n} \sum_{i=1}^{n} y_i,$$

and the total square sum of the calculated observed values and the average values is $SS_{tot} = \Sigma_{i=1}^{n}(y_i - \bar{y})^2$. A residual square sum of the curve-fit model prediction valves and the observed values is calculated as $SS_{res} = \Sigma_{i=1}^{n}(y_i - f_i) = \Sigma_{i=1}^{n} e_i^2$. Thus, the determination coefficient of the polynomial boundary curve function is $$R^2 = 1 - \frac{SS_{res}}{SS_{tot}}.$$

Then, the analysis of the residual plot upon the curve fit result can be performed to confirm if or not a distribution of residual difference is rational. Finally, the least order function whose analysis upon the error and the residual plot is satisfied is chosen as the mathematical model of boundary contour curve. Nevertheless, it shall be understood that the aforesaid description of the mathematical model of boundary contour curve for the workpiece 40 is just an example only for a concise explanation purpose, not to limit the scope of this disclosure.

Figure 3C:
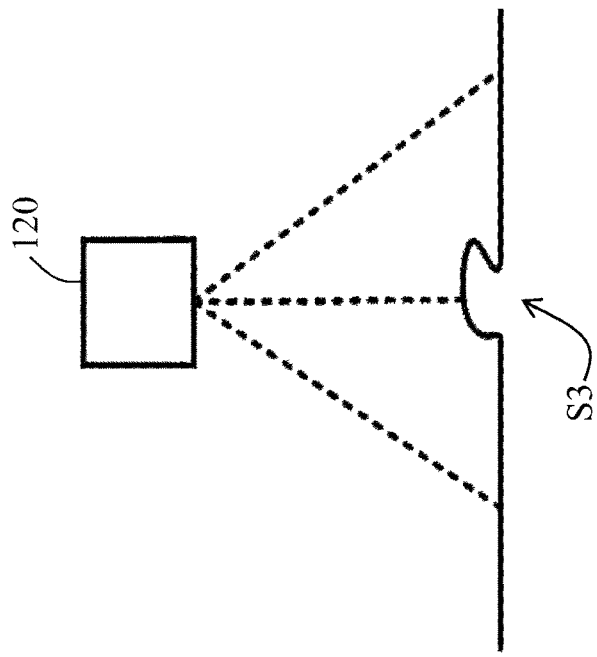
FIG. 3C shows schematically a further exemplary example of the possible burr position in accordance with this disclosure.
Figure 3B:
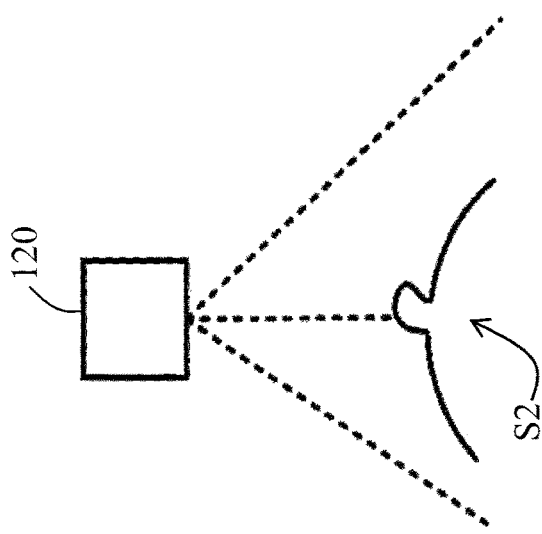
FIG. 3B shows schematically another exemplary example of the possible burr position in accordance with this disclosure.
Figure 3A:
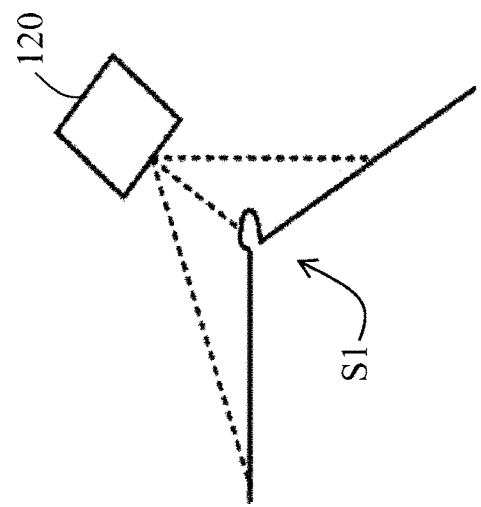
FIG. 3A shows schematically an exemplary example of the possible burr position in accordance with this disclosure.
Figure 4C:
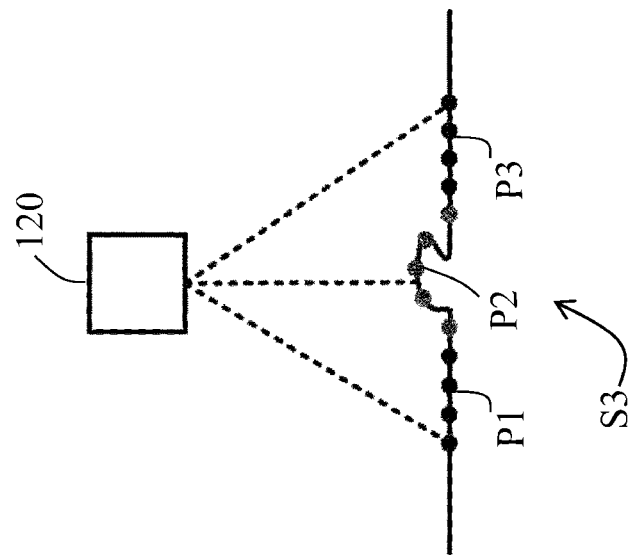
FIG. 4C shows schematically contour points of FIG. 3C.
Figure 4B:
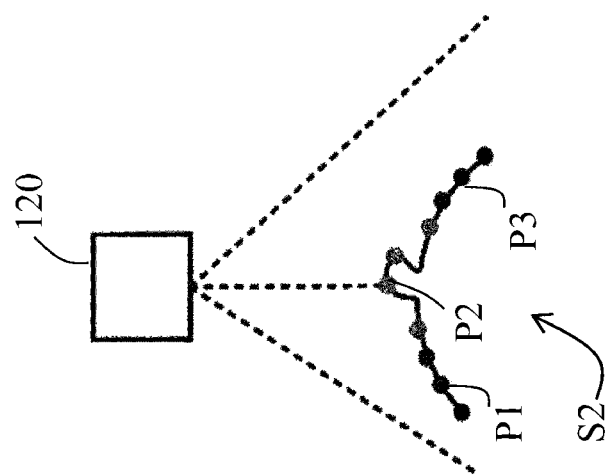
FIG. 4B shows schematically contour points of FIG. 3B.
Figure 4A:
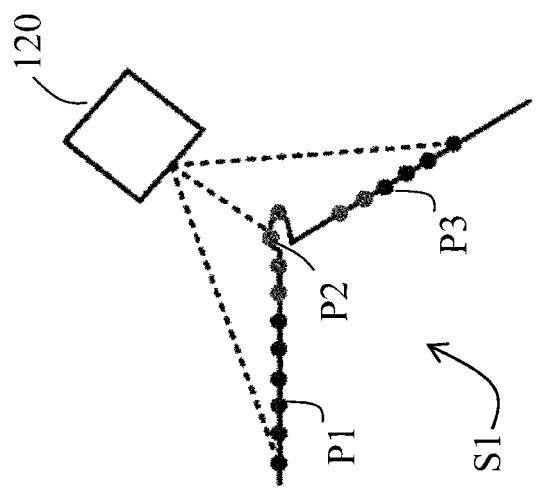
FIG. 4A shows schematically contour points of FIG. 3A.

After the mathematical model of boundary contour curve for the workpiece 40 is determined, then Step S130 can be performed to apply the linear contour sensor 120 to scan the workpiece 40, so that the contour section information of the workpiece 40 can be obtained. Among various manufacturing processes of metals or plastics, some of them can quickly reshape the workpiece 40, but would exist larger tolerances, such as casting, forging and injection molding. As such, a significant dimensional difference between the practical and the standard workpiece 40 can be expected. Hence, the mathematical model of boundary contour curve obtained from the CAD file 50 of the workpiece 40 can't be directly applied to the boundary contour of the practical workpiece 40. In this circumstance, the linear contour sensor 120 shall get involved to judge the boundary contour of the workpiece 40. It shall explain that, while the linear contour sensor 120 moves to scan the contour of the workpiece 40, the contour information neighboring the burr shall be included. Referring to FIG. 3A through FIG. 3C, while in scanning, the possible burr positions S1, S2, S3 shall be firstly moved close to a scan center of the linear contour sensor 120. Then, the contour information obtained by the linear contour sensor 120 would be sent for further processing. As shown in FIG. 4A to FIG. 4C, the contour section information of the workpiece 40 at contour points P1, P2, P3 can be obtained. The contour point P1 is used for providing the front-section contour point information, the contour point P3 is used for providing the rear-section contour point information, and the front-section and rear-section contour point information are both non-burr information. On the other hand, the contour point P2 is used for providing middle-section burr information. By subtracting the middle-section burr information but abstracting the front-section and rear-section contour point non-burr information, then the contour section information of the workpiece is formed. In the aforesaid management, the reason why the middle-section burr information is neglected is due that the protrusive appearance of the burr would affect the following curve-fit result.

Then, in Step S140, a curve-fit algorithm is performed by using an be the contour section information of the workpiece upon the mathematical model of boundary contour curve obtained from analyzing the CAD file 50 of the workpiece 40, such that a boundary curve function can be obtained. In detail, by having a fourth-order polynomial as the boundary curve function for example, provided that the fourth-order polynomial model can be expanded as $f(x) = a_0 + a_1 x + a_2 x^2 + a_3 x^3 + a_4 x^4$, if the contour curve contains two sections for different models, then contour points obtained by the scanning of the linear contour sensor 120 can be divided into the front-section and the rear-section contour points for individual curve fitting. If a single model of curves is used for fitting the contour curve, then the front-section and the rear-section contour points obtained by the linear contour sensor 120 would be plugged into the corresponding mathematical models for curve fitting. In the following expressions, $\{(x_1, y_1), (x_2, y_2), (x_3, y_3), \ldots, (x_n, y_n)\}$ stands for the data set of the contour points. Then, the contour points are plugged into the aforesaid fourth-order polynomial for calculating a sum of square error differences $E(a_0, a_1, a_2, a_3, a_4) = \Sigma_{i=1}^{n}(y_i - (a_0 + a_1 x_i + a_2 x_i^2 + a_3 x_i^3 + a_4 x_i^4))^2$, in which $a_0, a_1, a_2, a_3, a_4$ are unknown coefficients. In this embodiment, the purpose of curve fitting is to locate a group of coefficients $a_0, a_1, a_2, a_3, a_4$ that minimizes the error. Thus, by having the first-order derivative of the aforesaid polynomial to be zero, then an extremal position can be obtained. In addition, following five linear functions can be obtained by performing partial differentiation with respect to $a_0, a_1, a_2, a_3, a_4$, respectively.

By assigning $$\frac{\partial}{\partial a_0} E(a_0, a_1, a_2, a_3, a_4) = 0$$

to derive the extremal position, the first equation would be $\Sigma_{i=0}^{n} a_0 + a_1 \Sigma_{i=0}^{n} x_i + a_2 \Sigma_{i=0}^{n} x_i^2 + a_3 \Sigma_{i=0}^{n} x_i^3 + a_4 \Sigma_{i=0}^{n} x_i^4 = \Sigma_{i=0}^{n} y_i$; then, by assigning $\partial/\partial a_1 E(a_0, a_1, a_2, a_3, a_4) = 0$ to derive the extremal position, the second equation would be $a_0 \Sigma_{i=0}^{n} x_i + a_1 \Sigma_{i=0}^{n} x_i^2 + a_2 \Sigma_{i=0}^{n} x_i^3 + a_3 \Sigma_{i=0}^{n} x_i^4 + a_4 \Sigma_{i=0}^{n} x_i^5 = \Sigma_{i=0}^{n} x_i y_i$; then, by assigning $$\frac{\partial}{\partial a_2} E(a_0, a_1, a_2, a_3, a_4) = 0$$

to derive the extremal position, the third equation would be $a_0 \Sigma_{i=0}^{n} x_i^2 + a_1 \Sigma_{i=0}^{n} x_i^3 + a_2 \Sigma_{i=0}^{n} x_i^4 + a_3 \Sigma_{i=0}^{n} x_i^5 + a_4 \Sigma_{i=0}^{n} x_i^6 = \Sigma_{i=0}^{n} x_i^2 y_i$; then, by assigning $$\frac{\partial}{\partial a_3} E(a_0, a_1, a_2, a_3, a_4) = 0$$

to derive the extremal position, the fourth equation would be $a_0\Sigma_{i=0}^{n}x_i^3+a_1\Sigma_{i=0}^{n}x_i^4+a_2\Sigma_{i=0}^{n}x_i^5+a_3\Sigma_{i=0}^{n}x_i^6+a_4\Sigma_{i=0}^{n}x_i^7=\Sigma_{i=0}^{n}x_i^3y_i$; then, by assigning $$\frac{\partial}{\partial a_4}E(a_0, a_1, a_2, a_3, a_4) = 0$$

to derive the extremal position, the fifth equation would be $a_0\Sigma_{i=0}^{n}x_i^4+a_1\Sigma_{i=0}^{n}x_i^5+a_2\Sigma_{i=0}^{n}x_i^6+a_3\Sigma_{i=0}^{n}x_i^7+a_4\Sigma_{i=0}^{n}x_i^8=\Sigma_{i=0}^{n}x_i^4y_i$; and finally, solve these five linear simultaneous equations to obtain coefficients $a_0, a_1, a_2, a_3, a_4$ for the mathematical model of boundary contour curve. As described above, such curve fitting is to plug the contour section information of the workpiece into each first-order partial differentiated equation of the mathematical model of boundary contour curve so as to obtain the coefficients. In this embodiment, these linear equations are the boundary curve functions, standing for the mathematical model of boundary contour curve.

Then, in Step S150, by providing the boundary curve functions, the deburring position information of the workpiece 40 can be determined for generating the processing path. The aforesaid boundary curve functions can be treated as the boundary contour of the workpiece 40.

Figure 5:
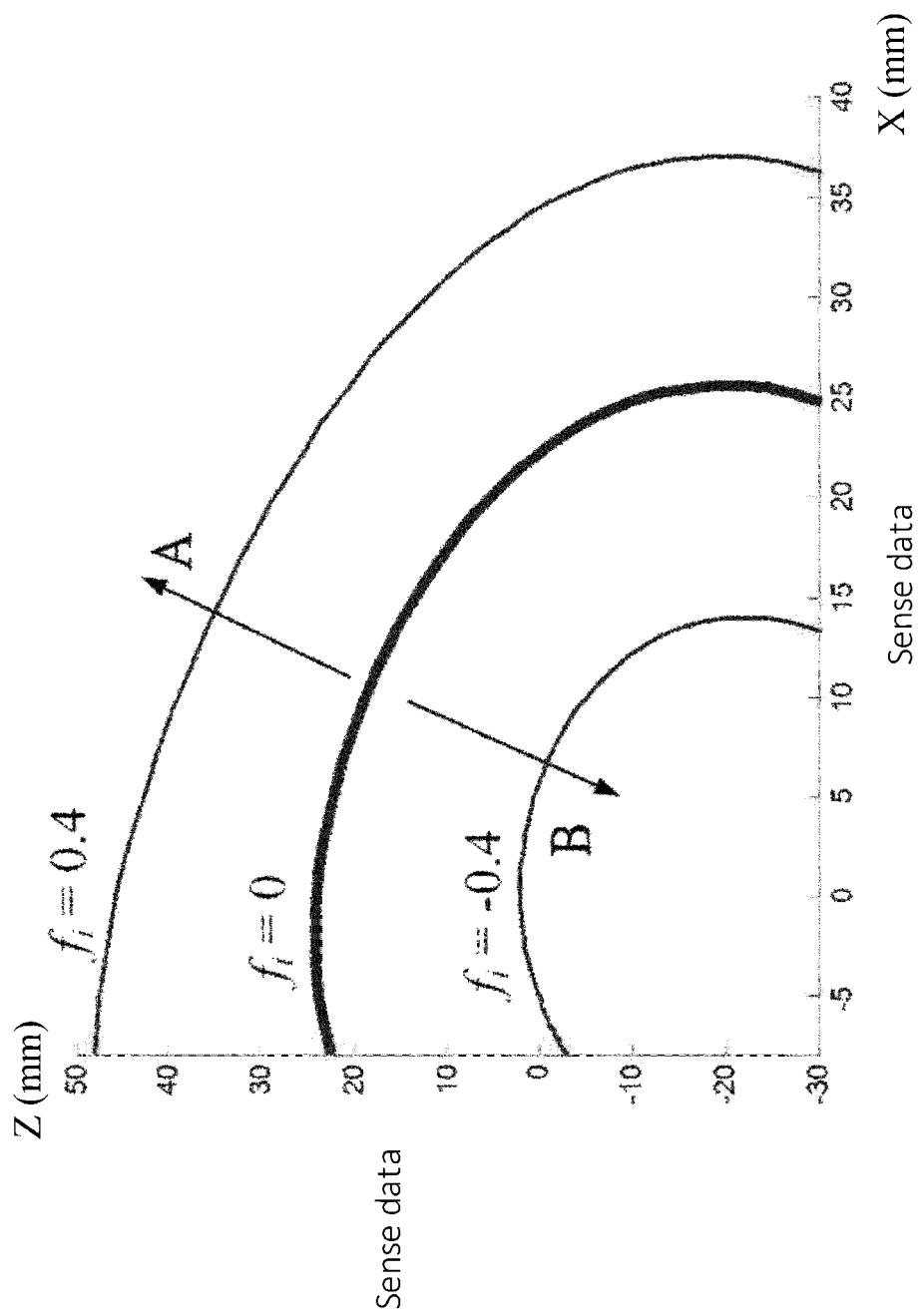
FIG. 5 shows schematically an exemplary example of the boundary curve function in accordance with this disclosure.
Figure 6:
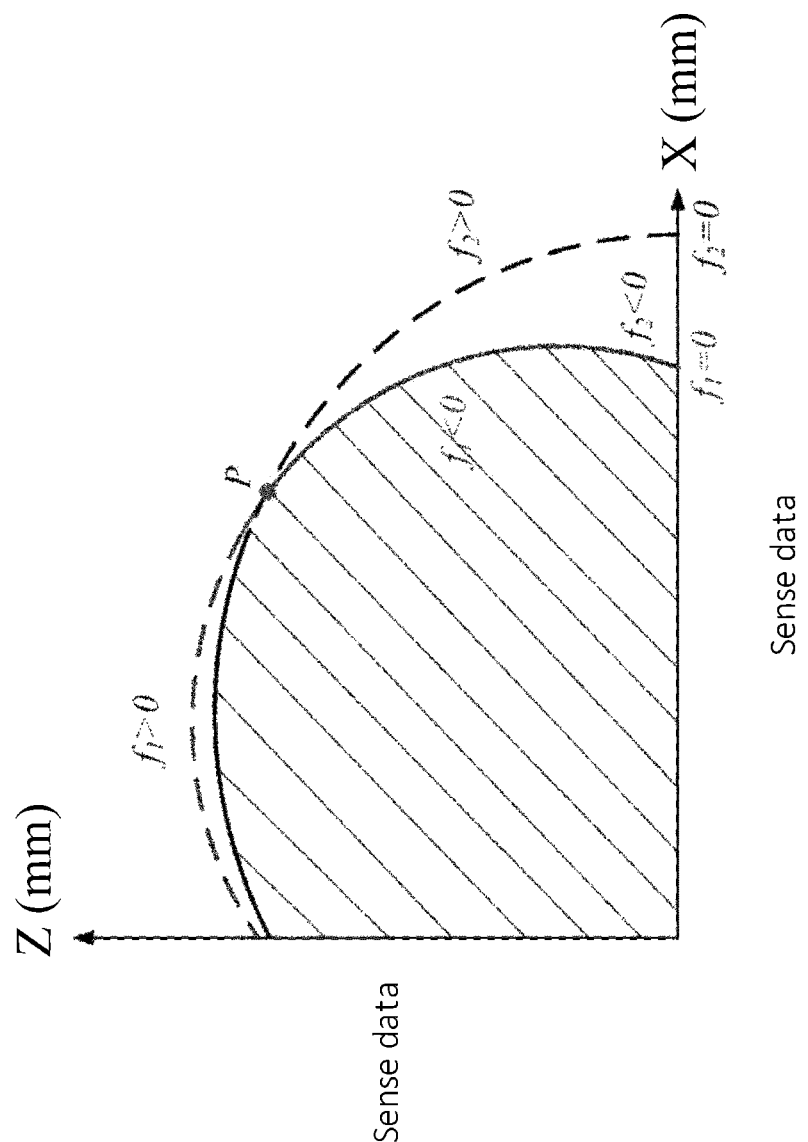
FIG. 6 shows schematically an inner side of the section contour of workpiece in accordance with this disclosure.

Referring now to FIG. 5 and FIG. 6, the horizontal axis thereof is used for the X-axial sense data of the linear contour sensor 120, while the vertical axis thereof is used for the Z-axial sense data of the linear contour sensor 120. The sense data is counted by a length unit, mm. For example, if the boundary curve function is $f_i(x, y)=0$, then the space can be divided into two regions: workpiece area A (i.e., the area opposite to the linear contour sensor 120) and surrounding area B (i.e., the area in the same side with the linear contour sensor 120), as shown in FIG. 5. Since the workpiece area A and the surrounding area B are corresponding to different function values (positive and negative function values, respectively) of the same function $f_i$, then whether X-axial sense data provided by the linear contour sensor 120 is located in the workpiece area A or in the surrounding area B can be simply determined by plugged this data into $f_i(x, y)=c$. If c is positive, then the X-axial sense data (x, y) is located in the workpiece area A. On the other hand, if c is negative, then the X-axial sense data (x, y) is located in the surrounding area B. If the section contour boundary curve is consisted of different line segments, then the common area of all $f_i<0$ is the interior of the section contour of the workpiece (as shown in FIG. 6). Then, the contour points P1, P2, P3 of FIG. 4A to FIG. 4C scanned by the linear contour sensor 120 are plugged into the corresponding boundary curve functions. If any function value $f_i(x, y)>\varepsilon$, then these points (x,y) can be determined as the burr positions B1, B2, B3, in which $\varepsilon$ is the allowable error of contour boundary, and the value of $\varepsilon$ is determined by the precision of the linear contour sensor 120 and the residual-plot error of the curve fitting, as shown in FIG. 7A to FIG. 7C.

Figure 8:
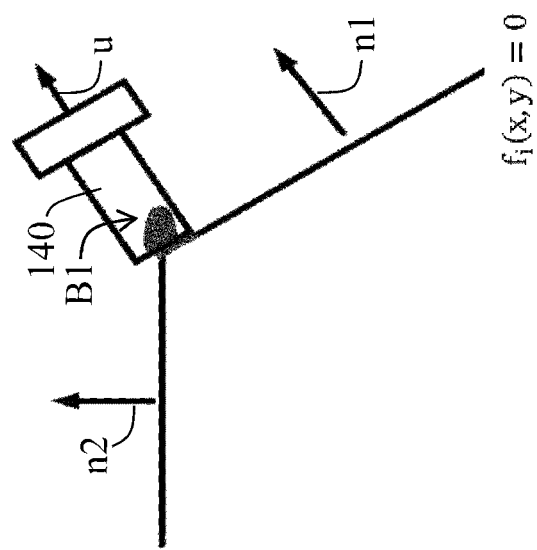
FIG. 8 demonstrates schematically that a cutter is performing deburring upon FIG. 7A.

Then, in Step S160, based on the processing path, the deburring is performed. Based on the aforesaid boundary curve function and the burr investigation result, the processing path of deburring can be generated. The control module 110 can follow the processing path to control the robotic arm 130 to move, especially to lower a bottom edge of the cutter 140 just to contact the contour curve. As shown in FIG. 8, the section contour boundary curve has normal vectors n1, n2 of the curve, and the axial direction u of the cutter 140 at the burr position B1 is parallel to the normal vector n1. By having the cutter 140 to machine the workpiece 40, the burrs can be removed, and then go back to Step S140. To remove the next burr, for example, located at a position in the moving direction of the cutter 140 (deep into the paper of FIG. 8), then the contour section information of the workpiece and the mathematical model of boundary contour curve for the next burr are utilized to undergo a new curve fit process so as to obtain a new set of boundary curve functions. Then, Step S150 is introduced to perform the burr analysis upon the next boundary contour and to generate the path points. If the scan and processing for all the burr processing areas have finished, then the deburring process for this workpiece 40 is complete.

In summary, in the method and system for recognizing a deburring trajectory provided by this disclosure, the curve fit technique is applied to determine the deburring position information of the workpiece and to generate the processing path. Thereupon, disadvantages of time-consuming and hard-to-tracking for human teaching or 3D-point cloud analysis in the art can be well avoided. In addition, the processing path error and dimensional variation of workpiece can be compensated in time, and so the entire processing quality can be substantially enhanced.

Further, the linear contour sensor is used for capturing the section contour information, and the burr distribution as well as generation of the deburring trajectory can be determined by simply analyzing one of the section contour information. Thus, by providing this disclosure, tracking the deburring trajectory can be performed online, and, without complete scan data of the workpiece, the analytic work can be also executed to proceed online path track and trajectory error compensation.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for recognizing a deburring trajectory, relevant to be performed by a controller or a computer, comprising the steps of:
   (a) according to a process flow of a workpiece, analyzing a CAD file of the workpiece, determining a burr processing area and obtaining a mathematical model of boundary contour curve, wherein the process flow includes a preceding machining pattern and its cutting directions;
   (b) applying a linear contour sensor to scan the workpiece to obtain contour section information of the workpiece;
   (c) performing curve fitting upon the contour section information of the workpiece and the mathematical model of boundary contour curve so as to obtain a boundary curve function; and
   (d) utilizing the boundary curve function to determine deburring position information of the workpiece and to further generate a processing path;
   wherein the step (a) includes the steps of:
   (a1) cross-sectioning the burr processing area of the workpiece in a cutting direction so as to obtain section contour information of a working area; and
   (a2) according to section contour curve characteristics of the burr processing area, dividing the section contour information of the working area into a plurality of segments for individually determining the mathematical models of boundary contour curves of the workpiece; and wherein the step (b) includes the steps of:
(b1) obtaining contour information neighboring a burr, the contour information including burr information and non-burr information; and
(b2) removing the burr information, and defining the non-burr information as the contour section information of the workpiece.

2. The method for recognizing a deburring trajectory of claim 1, after the step (d), further including a step of, according to the processing path, applying a robotic arm furnished with a cutter to perform machining.

3. The method for recognizing a deburring trajectory of claim 1, prior to the step (a), further including a step of importing the CAD file of the workpiece.

* * * * *